(12) United States Patent
Dewell et al.

(10) Patent No.: US 10,606,961 B2
(45) Date of Patent: Mar. 31, 2020

(54) TOOLS AND METHODS FOR DESIGNING INDOOR AND OUTDOOR WAVEGUIDE SYSTEM NETWORKS

(71) Applicant: Corning Optical Communications LLC, Hickory, NC (US)

(72) Inventors: James Garrett Dewell, Hickory, NC (US); David Barth Hopper, Claremont, NC (US); Joseph Clinton Jensen, Lawndale, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 653 days.

(21) Appl. No.: 15/348,212

(22) Filed: Nov. 10, 2016

(65) Prior Publication Data

US 2017/0154130 A1    Jun. 1, 2017

Related U.S. Application Data

(60) Provisional application No. 62/260,863, filed on Nov. 30, 2015.

(51) Int. Cl.
| | |
|---|---|
| *G06Q 30/00* | (2012.01) |
| *G06F 17/50* | (2006.01) |
| *G06Q 10/06* | (2012.01) |
| *G06Q 10/10* | (2012.01) |
| *G06Q 30/06* | (2012.01) |

(52) U.S. Cl.
CPC ............ *G06F 17/50* (2013.01); *G06Q 10/067* (2013.01); *G06Q 10/10* (2013.01); *G06Q 30/0621* (2013.01); *G06Q 30/0635* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 6,662,183 B2 | 12/2003 | Beyer | |
| 2005/0177435 A1 | 8/2005 | Lidow | |
| 2006/0045523 A1 | 3/2006 | Kozischek | |
| 2007/0088709 A1 | 4/2007 | Bailey et al. | |
| 2009/0154792 A1 | 6/2009 | Sun et al. | |

FOREIGN PATENT DOCUMENTS

EP    1251656 A1    10/2002

OTHER PUBLICATIONS

International Search Report and Written Opinion PCT/US2016/062036 dated Jan. 27, 2017.

*Primary Examiner* — Mila Airapetian
(74) *Attorney, Agent, or Firm* — William D. Doyle (57) ABSTRACT

Design tools and methods of use for designing, ordering, and providing manufacturing and installation instructions for waveguide system networks include a system design tool including a location selection module to determine a selected location, a satellite imagery component to provide an image based on the selected location, an overlay module to overlay a design on the image, and a customization module to customize the design. The system design tool includes one or more design modules to at least one of automatically output and build via user input one or more design options based on the image, and a design customization module to select the design from the one or more design options. The system design tool includes a positioning module to set a pair of connectivity points such that a cable length may be automatically calculated based on a calculated distance between the pair of connectivity points.

10 Claims, 4 Drawing Sheets

FIG. 3

TOOLS AND METHODS FOR DESIGNING INDOOR AND OUTDOOR WAVEGUIDE SYSTEM NETWORKS

CROSS-REFERENCE TO RELATED APPLICATIONS

This application claims the benefit of priority under 35 U.S.C. § 119 to U.S. Provisional Application No. 62/260,863, filed on Nov. 30, 2015, and is incorporated herein by reference.

BACKGROUND

Field

The present specification generally relates to indoor and outdoor waveguide system networks and, more specifically, to design tools and methods for designing, ordering, and providing manufacturing and installation instructions for waveguide system networks such as Fiber-to-the-X ("FTTx") optical fiber system networks.

Technical Background

Fiber optic cables are an attractive alternative to bulky traditional conductor cables (e.g., copper) in waveguide systems allowing for a wide bandwidth data transmission while simultaneously transporting multiple signals and traffic types and/or high-speed Internet access, especially as data rates increase. As the use of fiber optics migrates into numerous consumer electronics applications, such as connecting computer peripherals by the use of fiber optic cable assemblies, there will be a consumer-driven expectation for cables and associated waveguide systems having improved performance, compatibility with future communication protocols, and a broad range of use.

Currently, customers seeking to build waveguide system networks such as FTTx optical fiber system networks typically are required to utilize multiple system tools and processes to design a network, order the necessary parts, and install the network design. Such customers tend to utilize high labor rate employees such as specialized design engineers to plot, map, and design indoor and outdoor waveguide system networks including, for example, fiber optic system networks. The design engineers often first build their design upon paper maps and transition the design to a Computer-Aided Design ("CAD") software program, or they build the design in a complex CAD environment. The design engineers or other employees then create a bill-of-materials ("BOM"), which they proceed to have to manually cross-reference with vendor's part numbers before submitting the BOM to a procurement department to place a purchase order to the vendor. Such multi-step processes utilizing various systems and employees tends to result in a costly and time-intensive efforts.

Accordingly, a need exists for alternative less costly and time-intensive system tools to design, order, and provide manufacturing and installation instructions for waveguide system networks, such as FTTx optical fiber system networks.

SUMMARY

According to one embodiment, an integrated system design tool for designing, ordering, and providing manufacturing and installation instructions for waveguide system networks includes a user interface module to prompt and receive user input data over a computer network relating to a fiber optic network design; a fiber optic parameter database storing a plurality of fiber optic parameters; a location selection module for selecting a location; a satellite imagery component to provide an image to the user interface module based on the selected location; an overlay module that overlays a fiber optic network design on the image based on the selected location and the plurality of fiber optic parameters; a network analyzer module connected to said user interface module and said fiber optic parameter database to calculate fiber optic network design data based upon the user input data and the fiber optic network design determined from the overlay module; the fiber optic network design data comprising different optical fiber type data and different optical fiber cable count data for different fiber optic network topologies, and cost data; and a user report module connected to said network analyzer module to send at least one fiber optic network design report to the user over the global computer network and based upon the calculated fiber optic network design data.

In accordance with yet other aspects of the present disclosure, a system design tool includes a location selection module to determine a selected location, a satellite imagery component to provide an image based on the selected location, an overlay module to overlay a design on the image, and a customization module to customize the design. The system design tool includes one or more design modules to at least one of automatically output and build via user input one or more design options based on the image, and a design customization module to select the design from the one or more design options. The system design tool includes a positioning module to set a pair of connectivity points such that a cable length is automatically calculated based on a calculated distance between the pair of connectivity points.

Additional features and advantages of the design tools and methods of use for designing, ordering, and providing manufacturing and installation instructions for waveguide system networks described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiment(s) of the system design tools for designing, ordering, and providing manufacturing and installation instructions for waveguide system networks described herein, examples of which are illustrated in the accompanying drawings. Whenever possible, the same reference numerals will be used throughout the drawings to refer to the same or like parts.

Customers seeking to install waveguide systems are in need of less costly and time-intensive system tools to design, order, and provide manufacturing and installation instructions for waveguide system networks, such as FTTx optical fiber system networks. The systems as described herein may provide a cost-efficient, centralized, and efficient waveguide system network design tool to build a network for fast internet access, for example, to locations seeking to obtain broadband networking such as FTTx optical fiber system networks. Such locations may include, for example, one or more locations displayed by satellite imagery, such as the location schematically displayed as a satellite imagery depiction in FIG. 1A, which is described in greater detail further below.

Embodiments of the system described herein create a single, central processing platform to streamline such indoor and outdoor fiber optic and other waveguide system design to reduce a significant amount of man-hours that would otherwise be needed to design such systems through use of multi-portal processes and/or manual design engineering labor. The system described herein may, for example and as described in greater detail below, automatically calculate distances in near real-time between selected locations, such as a pair of connectivity points between which to place a length of cable. The system may further automatically propose recommended parts to order to build the proposed design.

Figure 1A:
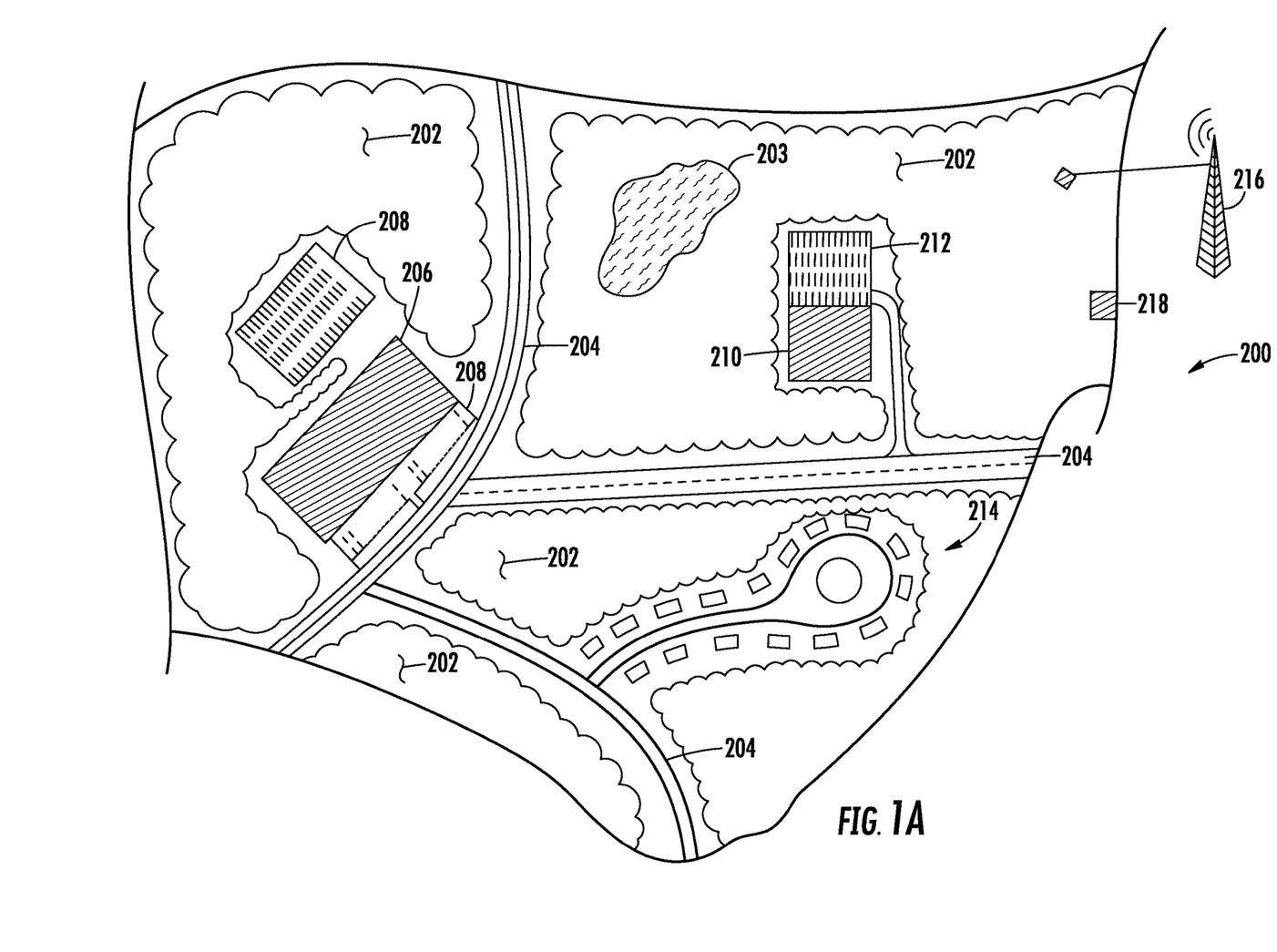
FIG. 1A schematically illustrates an example sample imagery of a location selected for a waveguide system network design, according to one or more embodiments shown and described herein.
Figure 1B:
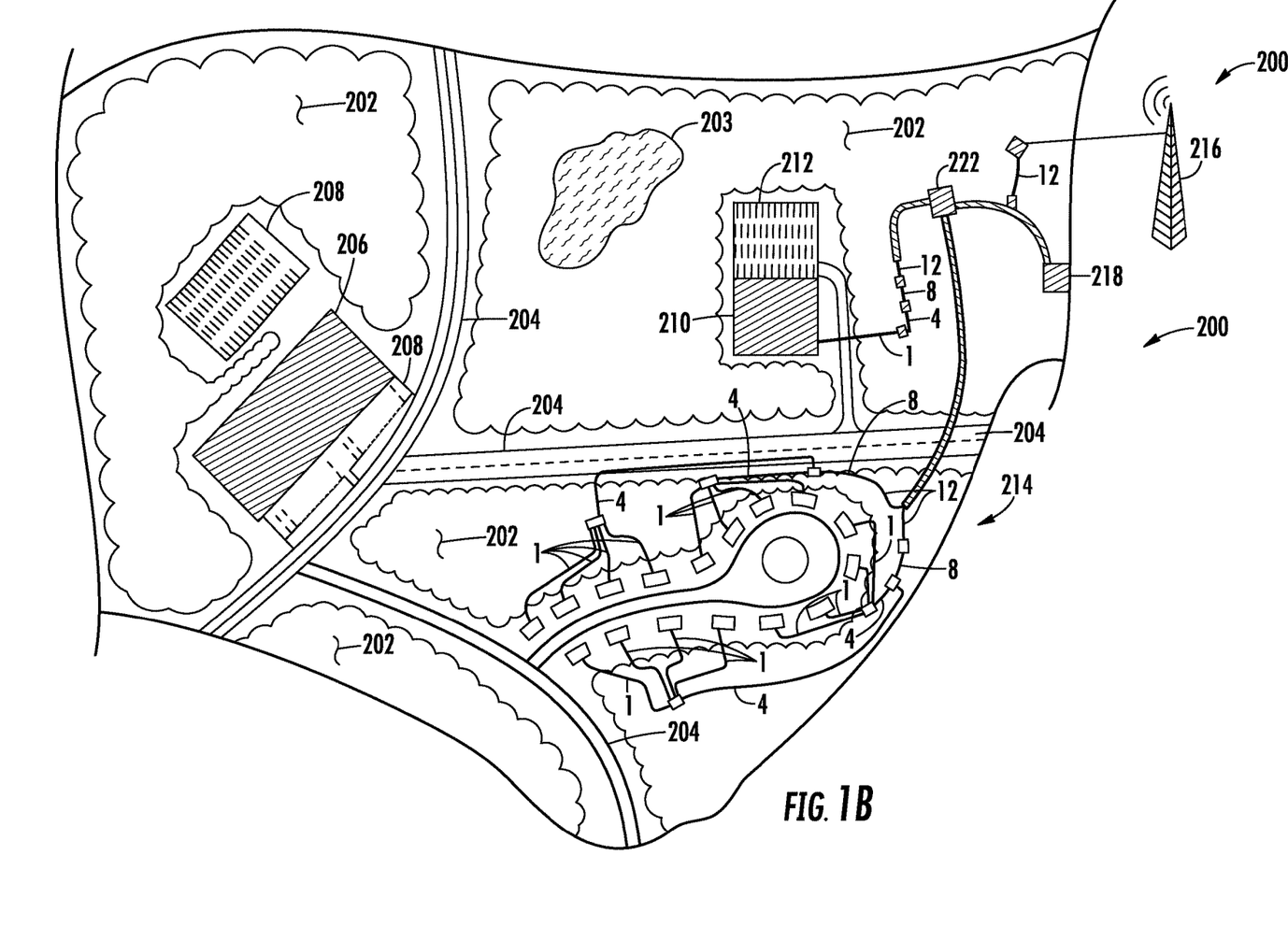
FIG. 1B schematically illustrates an example design overlay over the sample imagery of FIG. 1A, according to one or more embodiments shown and described herein.
Figure 2:
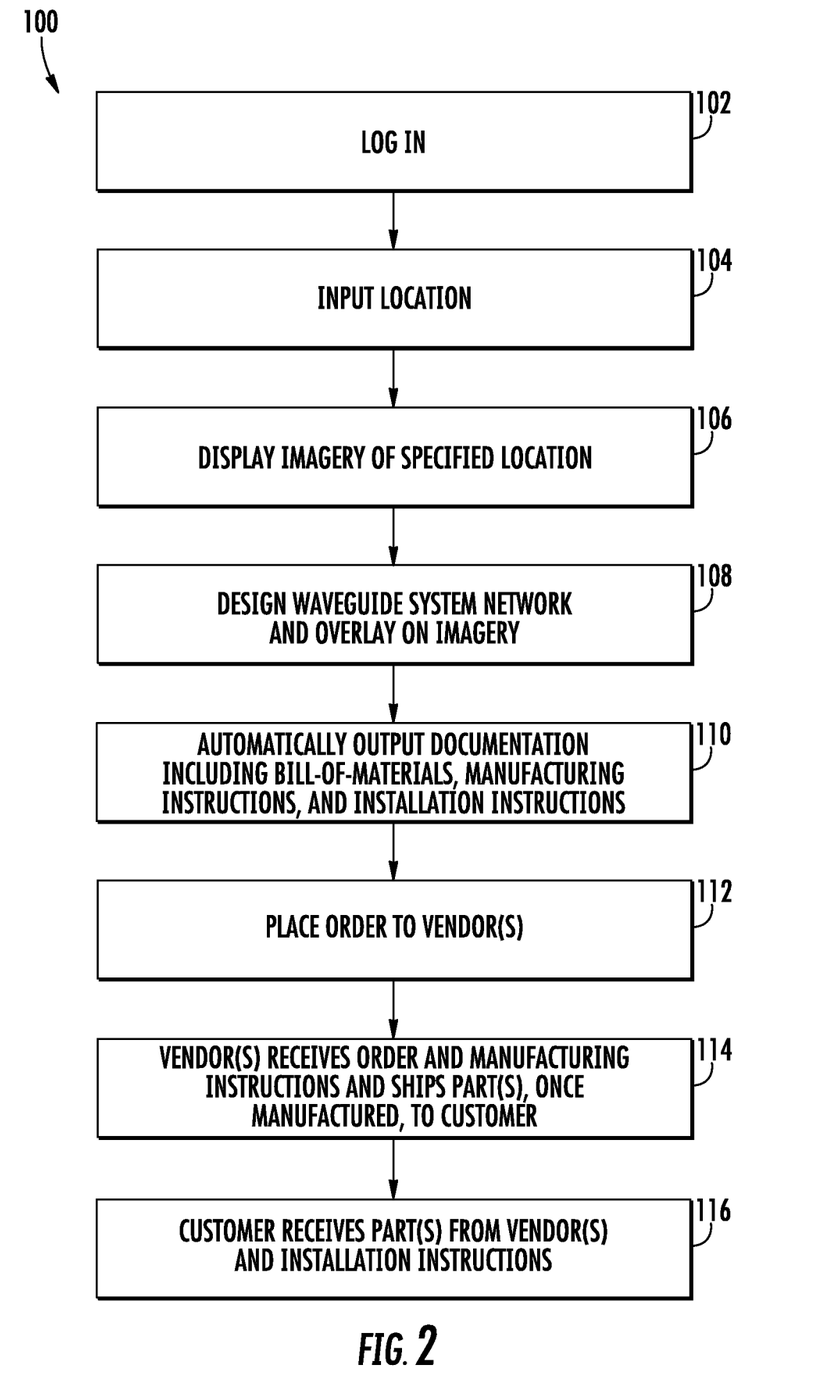
FIG. 2 schematically illustrates an example flow chart of a method of use of a system design tool for designing, ordering, and providing manufacturing and installation instructions for waveguide system networks, according to one or more embodiments shown and described herein.
Figure 3:
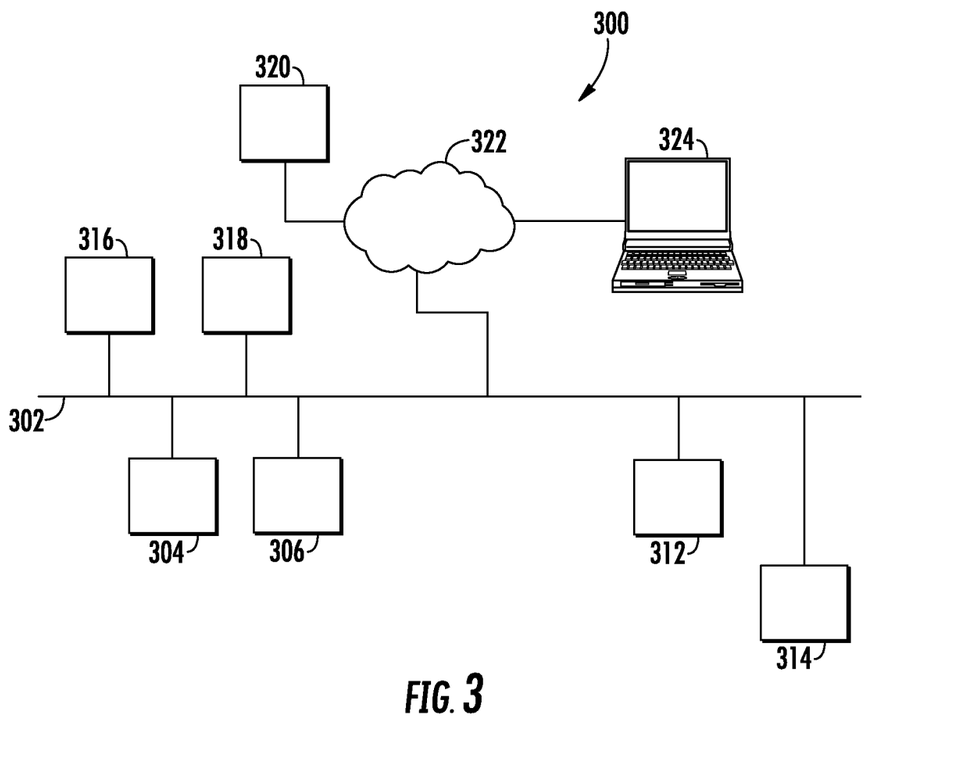
FIG. 3 schematically illustrates a system for implementing computer and software based methods to utilize system design tools for designing, ordering, and providing manufacturing and installation instructions for waveguide system networks, according to one or more embodiments shown and described herein.

An embodiment of a system for implementing computer and software based methods to utilize design tools for designing, ordering, and providing manufacturing and installation instructions and specifications for waveguide system networks such as broadband network architecture employing a fiber optic system network is shown in FIG. 3 and described with reference to FIGS. 1A-3 below. For example, FIG. 1A schematically illustrates an example sample imagery of a location selected for a waveguide system network design, and FIG. 1B schematically illustrates an example design overlay over the sample imagery of FIG. 1A. FIG. 2 schematically illustrates an example flow chart of a method of use of a system design tool for designing, ordering, and providing manufacturing and installation instructions for waveguide system networks as implement by the system of FIG. 3, which is described in greater detail further below.

Various embodiments of such design tools and methods of use to automatically design and/or modify customized, location specific waveguide system networks and generate output documents related to manufacturing and installation instructions and specifications for the networks in a centralized system are described in detail herein.

FIG. 2 illustrates an embodiment of a method 100 of use of such an example system 300 as shown in FIG. 3, which is described in greater detail below with respect to FIG. 3. Block 102 of the method 100 of FIG. 2 sets forth a user interface for a user to log into the system 300 and access the system 300 based on pre-set user permissions associated with the user login.

The system 300 further includes a location selection module to determine a selected location. For example, as shown in block 104 of FIG. 2, a location for the network to be designed is further input into the system 300 by the user, who may be a customer wishing to design a waveguide system network, for example. As non-limiting examples, the user may input a physical address, a road intersection, a business name, or other location identifier to input the specific location desired for a waveguide system design.

The system 300 additionally includes a satellite imagery component such as GIS mapping software to provide an image based on the selected location, as illustrated in block 106 of FIG. 2. The satellite imagery component will be able to zoom in on the image, zoom out form the image, or scroll in different directions with respect to the image.

The system further includes an overlay module, shown in block 108 of FIG. 2, to overlay a design onto and over the image, as well as a customization module to customize the design. As a non-limiting example, the user may select a button associated with a particular design from a list of design options, which particular design is then overlayed onto the image and may be modified by the user.

Moreover, the system 300 includes one or more design modules from which to build, select, and/or modify a design. For example, the design modules may automatically output one or more design options based on the image. Alternatively or additionally, the design modules may, via user input, build one or more design options based on the image. The one or more design modules may be communicatively coupled to a graphical user interface ("GUI") on which the image is shown such that a user may select drag and drop design options as shown on the GUI onto the image. The design options that are dragged and dropped onto the image may be linked with vendor specific part numbers. For example, parts from the FLEXNAP™ Fiber-to-the-Home ("FTTH") Access Network Design series as commercially available by Corning, Inc. of Corning, N.Y. may be used. To note, FTTH is a type of and a subset of FTTx, and FTTx may include other system designs such as Fiber-to-the-Desktop ("FTTD"), Fiber-to-the-Neighborhood ("FTTN"), and/or the like as should be understood to those of ordinary skill in the art and are within the scope of this disclosure.

Further, the system 300 includes a design customization module to select and/or modify the design from the one or more design options. The system 300 further may include positioning modules to set at least a pair of connectivity points such that, for example, a cable length of a fiber optic cable design is automatically calculated by the system based on a calculated distance between the pair of connectivity points. For example, the system 300 may utilize different design options such as a pair of local convergence point cabinets virtually inserted by a user onto the image via a drag and drop option to calculate correct distance and position information for the resulting required parts. From the calculated distance and position information, the system 300 then generates manufacturing and installation specifications and instructions for the resulting required parts. As another non-limiting example, a start of a cable may be dropped in front of a first address on the image and an end of the cable dropped in front of a second address, and from the pair of drop points the system 300 will automatically determine a real world length of the cable. The system 300 calculates the position of all products and components required and selected to complete a network design in relation to each other to generate, for example, correct lengths for cables, drop points, cable distribution structures (such as multi-port tethers branching off from the cables), and/or terminal or network access points associated with the cable and cable distribution structures.

The one or more design modules may determine design recommendations based on a variety of factors. For example, a determination may be based on a cable path limitation to determine how to run cables at a single location and/or between multiple locations including residential and/or non-residential areas along either a single route or multiple routes. The cables may pass through one or more splicing cabinet locations at respective local convergence points for the cables. At such splicing cabinet locations, for example, different cables may be mechanically joined to one another via mechanical splicing or joined to one another via fusion splicing that may employ an electric arc to join cables. The system 300 may also automatically determine and recommend where to place such local convergence points on the overall design. Another design recommendation may be based on fiber counts of a number of fibers to pull from an overall cable and network access points of the overall cable to determine placement and location of the cable and to optimize the design based on pre-selected factors such as, for example, material cost and/or labor cost. Other design recommendations from the one or more design modules may be based on factors such as an aerial span and buried span determination of cable placement, including determination as to how and where to transition between aerial poles and buried connectivity units housing the cable(s). Further design recommendations may be based on specified single fiber drop locations to connect, for example, to household hardware to which to run fiber optics, and other hardware requirements such as location of housings about fusion splice areas. Additional design recommendations may be based on part number generation of network parts, splice plans between manufactured cables to multi-port fiber units and between manufactured cables to cabinets at local convergence points, shortest cable path determinations, and/or other like variables associated with waveguide system network design that should be understood to be within the scope of this disclosure. A database and/or catalog section of the system 300 may additionally include a complete list of materials with associated part numbers to select from for the waveguide system network design.

Once the system 300 designs the waveguide system network and overlays the design on the displayed imagery, the system 300 automatically outputs documentation based on the design, as shown in block 110 of FIG. 2. Output documentation for a network design may include, for example, a bill-of-materials ("BOM") listing required parts and associated vendor pricing from the database and/or catalog section, manufacturing instructions for vendor(s) to manufacture the required parts, and installation instructions for a customer regarding how to install the manufactured parts.

The system 300 may utilize an online ordering system to streamline the ordering of complex products listed on the BOM, which may be added to online virtual shopping cart for a streamlined, centralized ordering. For example, as shown in block 112 of FIG. 2, the system 300 places one or more orders to one or more vendors based on the outputted BOM. As a non-limiting example, the one or more orders may be placed through a procurement or purchase order department that has received the BOM from the system 300 and/or alerts as to any BOM status updates. The system may incorporate a procurement workflow process including a design approval process requiring departmental and/or a specific ranking employee approval of the design, a similar BOM approval process, and an order workflow associated with a notice to the procurement department to generate one or more purchase orders online via the system 300 once the approvals are secured. The system 300 may then submit the electronic purchase order(s) to the vendor(s). Additionally or alternatively, a user of the system 300 may directly place the one or more orders to the vendor(s) once the BOM is generated, for example.

Next, block 114 of FIG. 2 illustrates that the vendor(s) receives the one or more orders as well as associated manufacturing instructions. The system 300 may be integrated with one or more vendor backend systems such that customers may be able to view and track the status of an order, such as when the order was received by the vendor, processed, manufactured, completed, and/or shipped. Once the ordered part(s) are manufactured, the vendor will ship the part(s) to a customer.

At block 116 of FIG. 2, the customer receives the part(s) from the vendor(s) as well as associated installation instructions regarding how to install the part(s) to physically build the waveguide system design. For example, the installation instructions may direct a user on how to splice cables within cabinets at one or more local convergence points, and how to link a cable to cable distribution structures having 2, 4, 8, or 12 multi-port options, as described in greater detail further below.

Referring once again to FIG. 1A, an example sample imagery 200 of a location selected for a waveguide system network design may utilize satellite imagery and/or GIS mapping software. In FIG. 1A, the imagery illustrates trees 202, a lake 203, streets 204, a commercial building 206 along with associated parking lots 208, a multi-dwelling unit 210 and associated parking lot 212, a set of single-family residences 214, a transmitter/receiver station 216, and a local convergence point 218. For a user interested in using the system 300 to design a FFTx system network to, for example, connect a fiber optic cable to the residential units such as the multi-dwelling unit 210 and the set of single-family residences 214, the system 300 may recommend a variety of options based on desired optimization parameters. For a desired reduction in labor cost over more labor intensive designs, the system 300 may recommend a design requiring less transitioning between aerial and ground lines. Additionally or alternatively, for a desired reduction in material costs over more costly designs, the system 300 may recommend different placements of terminal or network access points to shorten or lengthen placed cables at cost-efficient and easily accessible connectivity points.

FIG. 1B illustrates an example design 220 of a FFTx network overlayed on the sample imagery 200 of FIG. 1A. For example, another local convergence point 222 is placed in the design 220 and is connected with a cable to the local convergence point 218, as well as to the transmitter/receiver station 216 through a cable distribution structure through which, in this example, 12 fibers are selected and pulled from the overall cable. The overall cable may have a range of 12 to about 216 fibers or be a 24, 48, 72, or 96 RPX Ribbon Distribution Cable as commercially available by Corning, Inc. of Corning, N.Y., for example. Another cable may be run from the local convergence point 222 and be split between cable distribution structures through each of which 12 fibers are selected and pulled from the cable, followed by 8 fibers, followed by 4 fibers, and then followed by a single fiber that is dropped, run into, and connected to associated receiving hardware within the multi-dwelling unit 210. Further, another cable may be run from the local convergence point 222 and split between such cable distribution structures to provide individual fibers from the cable containing multiple fibers to individual residences of the set of single-family residences 214.

In the example of FIG. 1B, a first cable distribution structure permits the pulling and selection of 12 fibers from the overall cable, and a second cable distribution structure permits the pulling and selection of another 12 fibers from the overall cable. Each of the first and second cable distribution structures are then connected to other respective third and fourth cable distribution structures to respectively pull and select 8 fibers from the selected 12 fibers. Next, the selected 8 fibers are connected to additional respective cable distribution structures to respectively pull and select 4 fibers from the 8 fibers. From these 4 fibers, a single fiber selection is made, and each of the four single fibers is run to a respective one of four individual single-family residences. As a non-limiting example, the cable distribution structures may be a 2, 4, 6, 8, or 12 fiber OptiSheath MultiPort Terminal and OptiFit MT Cable Assembly to be connected, via OptiTip MT Multi-Fibre Connectors, to a tether line or other connection portal attached to a cable at a network access point, all of which products are commercially available by Corning, Inc. of Corning, N.Y.

Positioning modules of the system 300 may allow a user to set a pair of connectivity points on the design 220, such as those shown between the cable distribution structures of the design 220. A proposed cable length may be automatically calculated by the system 300 based on an automatically calculated distance between the pair of connectivity points. A user may additionally utilize a web-based application such as a smart phone to chart and measure such connectivity points during an actual field evaluation. Such measurements may be stored in a database associated with the system 300 and relied upon to prepare a FTTx design. For example, a user may have a web-based application having a GPS positioning component. The user, with this GPS positioning component, may walk between poles between which the user plans to place a cable such that the user is able to retrieve and store actual GPS coordinates of the poles, and upload and integrate those GPS coordinates in real-time or at a later point with a proposed design of the system 300.

Referring to FIG. 3, a non-transitory system 300 for implementing a computer and software-based method to utilize system design tools for designing, ordering, and providing manufacturing and installation instructions and specifications for waveguide systems is illustrated as being implemented along with using a GUI that is accessible at a user workstation (e.g., a computer 324), for example. The system 300 includes a communication path 302, one or more processors 304, a non-transitory memory component 306, a tool integration component 312, a storage or database 314, a web-based application component 316, a network interface hardware 318, a network 322, a server 320, and the computer 324. The various components of the system 300 and the interaction thereof will be described in detail below.

While only one web-based application component 316, one application server 320, and one user workstation computer 324 is illustrated, the system 300 can include multiple application components, application servers containing one or more applications, and workstations that can be located at geographically diverse locations across a plurality of industrial sites. In some embodiments, the system 300 is implemented using a wide area network (WAN) or network 322, such as an intranet or the Internet. The workstation computer 324 may include digital systems and other devices permitting connection to and navigation of the network. Other system 300 variations allowing for communication between various geographically diverse components are possible. The lines depicted in FIG. 3 indicate communication rather than physical connections between the various components.

The system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The system 300 of FIG. 3 also includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated system 300 further includes the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, as noted above, the system 300 comprises the display such as a GUI on a screen of the computer 324 for providing visual output such as, for example, information, satellite imagery, a waveguide system network design virtually overlayed on the satellite imagery, graphical reports, messages, or a combination thereof. The display on the screen of the computer 324 is coupled to the communication path 302 and communicatively coupled to the processor 304. Accordingly, the communication path 302 communicatively couples the display to other modules of the system 300. The display can include any medium capable of transmitting an optical output such as, for example, a cathode ray tube, light emitting diodes, a liquid crystal display, a plasma display, or the like. Additionally, it is noted that the display or the computer 324 can include at least one of the processor 304 and the memory component 306. While the system 300 is illustrated as a single, integrated system in FIG. 3, in other embodiments, the systems can be independent systems.

The system 300 comprises the web-based application component 316 for determining distance between a pair of connectivity points and a tool integration component 312 to assist with integration of the system 300 with other tools as described above. The web-based application component 316 and the tool integration component 312 are coupled to the communication path 302 and communicatively coupled to the processor 304. As will be described in further detail below, the processor 304 may process the input signals received from the system modules and/or extract information from such signals.

The system 300 includes the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 3, data from various applications running on computer 324 can be provided from the computer 324 to the system 300 via the network interface hardware 318. The computer 324 can be any device having hardware (e.g., chipsets, processors, memory, etc.) for communicatively coupling with the network interface hardware 318 and a network 322. Specifically, the computer 324 can include an input device having an antenna for communicating over one or more of the wireless computer networks described above.

The network 322 can include any wired and/or wireless network such as, for example, wide area networks, metropolitan area networks, the Internet, an Intranet, satellite networks, or the like. Accordingly, the network 322 can be utilized as a wireless access point by the computer 324 to access one or more servers (e.g., a server 320). The server 320 and any additional servers generally include processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

Embodiments of the system described herein create a single, central processing platform to streamline indoor and outdoor fiber optic and other waveguide system design, ordering, manufacturing, and installation, which reduces a significant amount of man-hours that would otherwise be needed to design such systems through use of multi-portal processes and/or manual design engineering labor. A similar reduction in cost occurs through the reduction of labor requirements ranging from highly skilled design engineers to installation personnel of varying skill levels. Further cost savings may be associated with the reduction in a number of multi-portal computer systems a customer would need to own and maintain to design such networks to a single, centralized portal.

The systems described herein provide a simple, centralized, streamlined, user-friendly tool to design, manufacture, and provide installation instructions and specifications for a waveguide system network design. The system may calculate distances in near real-time between selected locations, such as a pair of connectivity points between which to place a length of cable, and within the same timeframe propose recommended parts to order to build the proposed design compared to a more time-intensive, manual process of utilizing drafting design engineers and manual cross-referencing of a BOM. Thus, the systems as described herein may provide a cost-efficient, centralized, and speedy waveguide system network design tool to provide designs that will build a network for fast internet access, for example, to locations seeking to obtain broadband networking such as FTTx optical fiber system networks.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An integrated system design tool for designing waveguide system networks, the system design tool comprising:
    a memory;
    a processor coupled to the memory, the processor configured to implement:
        a user interface module to prompt and receive user input data over a computer network relating to a fiber optic network design;
        a fiber optic parameter database storing a plurality of fiber optic parameters;
        a location selection module for selecting a location;
        a satellite imagery component to provide an image to the user interface module based on the selected location;
        an overlay module that overlays a fiber optic network design on the image based on the selected location and the plurality of fiber optic parameters;
        a network analyzer module connected to said user interface module and said fiber optic parameter database to calculate fiber optic network design data based upon the user input data and the fiber optic network design determined from the overlay module;
        the fiber optic network design data comprising respective optical fiber type data and different optical fiber cable count data for different fiber optic network topologies, and cost data; and a user report module connected to said calculator/network analyzer module to send at least one fiber optic network design report to the user over the computer network and based upon the calculated fiber optic network design data.

2. The integrated system design tool according to claim 1, wherein the optical fiber type data comprises identification of at least one of a multimode optical fiber having a first core diameter, a multimode optical fiber having a second core diameter larger than the first core diameter, or a single mode optical fiber.

3. The integrated system design tool according to claim 1, wherein the processor is further configured to implement a positioning module to set a pair of connectivity points using the overlay module such that a cable length is automatically calculated based on a calculated distance between the pair of connectivity points.

4. The integrated system design tool according to claim 1, wherein the stored fiber optic parameters comprise fiber optic parameters based upon at least one of an industry standard or an optical fiber cable manufacturer's guidelines.

5. The integrated system design tool according to claim 1, wherein the processor is further configured to implement:
a user model database connected to said calculator/network analyzer module for storing user fiber optic network design data for a given set of user input data; and
a data mining module connected to said user model database to permit data mining therefrom.

6. The integrated system design tool according to claim 1, wherein the fiber optic network design report includes an automatically generated bill-of-materials (BOM) listing required parts and associated vendor pricing.

7. The integrated system design tool according to claim 6, wherein the processor is further configured to implement an online ordering system that automatically places one or more orders to one or more vendors based on the BOM.

8. The integrated system design tool according to claim 7, wherein the online ordering system is integrated with one or more vendor backend systems such that the user may be able to view and track a status of the one or more orders generated by the online ordering system.

9. The integrated system design tool according to claim 6, wherein the fiber optic network design report includes installation instructions automatically generated in accordance with the calculated fiber optic network design data.

10. The integrated system design tool according to claim 9, wherein the installation instructions include instructions on how to splice cables within cabinets at one or more local convergence points and how to link a cable to cable distribution structures having 2, 4, 8, or 12 multi-port options.

* * * * *